Aug. 7, 1934.  A. MEISSNER  1,969,379
APPARATUS FOR MAKING PIEZO ELECTRIC BODIES
Filed Nov. 12, 1929
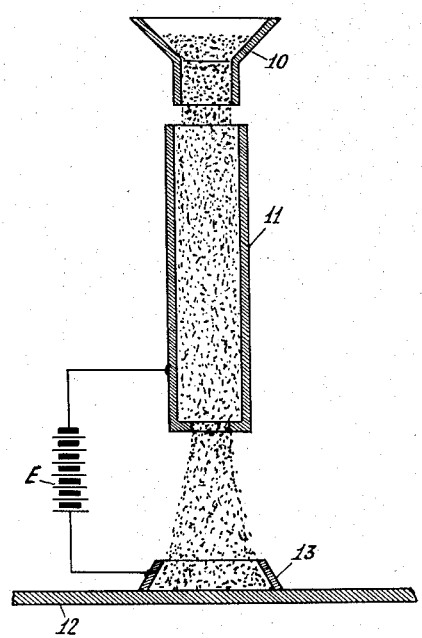
INVENTOR
ALEXANDER MEISSNER
BY
ATTORNEY Patented Aug. 7, 1934

1,969,379

UNITED STATES PATENT OFFICE 1,969,379

APPARATUS FOR MAKING PIEZO-ELECTRIC BODIES

Alexander Meissner, Berlin, Germany, assignor to Telefunken Gesellschaft für Drahtlose Telegraphie m. b. H., Berlin, Germany, a corporation of Germany Application November 12, 1929, Serial No. 406,554
In Germany November 13, 1928

3 Claims. (Cl. 252—1)

This invention relates to the piezo-electric art and deals more specifically with the preparation and manufacture of crystalline piezo-electric substances.

The method forming a part of this invention is especially useful for substances whose molecules or complex molecules present a polar character. The invention briefly resides in powdering the materials which are to be changed into crystalline form, heating the powdered material until it is molten, permitting the molten material to pass through an electric field upon a base where the material is allowed to cool. It has been found that the passage of the molten molecules of the material through the electric field causes a molecular arrangement of the material and straightens the molecules electrically so that the polar moments of the resultant product are all parallel and uni-directional. When the material which has been thus treated is again permitted to become solid the resultant material has a molecular structure of such a nature that all of the electrical moments of the several particles making up the material are in parallel directions and in the same sense. It has further been found that this molecular readjustment is permanent in the solidified material.

It has been found that in some cases when the powdered material is heated to the high temperatures necessary to melt the same that the pyro-electric effect produces the necessary electrical reaction to cause the molecules of the material to readjust and align themselves as indicated above, in the same way as if an outside electrical field had been employed. The preferable form, however, is to use a uni-directional electrical field to attain the desired result.

It has been found that the above described method is applicable to a large class of substances. Particularly suited for this purpose are all the silicates and also amorphous quartz. Amorphous quartz has been found, when in powdered form, to consist of highly complex molecular structures which have a polar character.

In accordance with a modification of the present invention some other substances possessing no inherent electrical moments may be admixed to the powdered substance during the heating process and thereby very widely different types of crystal combinations having the desired piezo-electric properties may be produced.

This invention has been found to be particularly applicable to substances having a molecular structure as disclosed in my co-pending application, Serial No. 405,818, filed in the United States Patent Office on November 8, 1929. Such substances are asphalts, the combination of asphalts and oils, waxes, paraffines and the like.

The manner in which the present invention is carried out will be more fully understood from the following description taken in connection with the accompanying drawing which is a diagrammatic representation of the apparatus used in carrying out the present invention.

Referring in detail to the drawing, 10 indicates a hopper into which the powdered material to be operated upon is poured. Below the hopper 10 is a heating member 11 of any suitable structure through which the powdered material is permitted to pass at a rate sufficient to bring the powder into the molten state. Underneath the heating member 11, suitably supported on a base 12, is disposed a mold 13 which is adapted to receive the molten material from the heating member 11 and mold the said molten material to the desired shape. Between the heater 11 and the mold 13, a direct current potential indicated by E is applied whereby the molten material in passing out of the heating member into the mold is subjected to a uni-directional electro-static field.

It will be understood, of course, that the particular apparatus used in carrying out the method of the present invention may be widely varied without departing from the spirit and scope of this invention. I, therefore, do not intend to be limited by the details of this disclosure except as defined in the appended claims.

Having thus described my invention, I claim:

1. Apparatus for preparing a piezo-electric body, comprising a heating member of sufficient length to cause said material to melt while passing through said heating member at a predetermined rate, a mold for molding said body to the desired shape, a direct current source connected to said heating member and said mold, and arranged so that said material is subjected to a uni-directional electrostatic field.

2. Apparatus for preparing a piezo-electric body from a silicious material, comprising a hopper to receive said silicious material, a heating member of sufficient length to cause said material to melt while passing through said heating member at a predetermined rate, a mold directly below said heating member, to mold said body to the desired shape, a direct current source connected to said heating member and said mold, and arranged so that said molten material will be subjected to a uni-directional electrostatic field.

3. Apparatus for preparing a solid piezo-electric body, comprising a heating member of sufficient length to cause said material to melt while passing through said heating member at a predetermined rate, a mold for molding said body to a desired shape, a direct current source connected to the surface of the molten material and to the surface of the material in the mold, and means for subjecting said material to a uni-directional electrostatic field while cooling.

ALEXANDER MEISSNER.